United States Statutory Invention Registration [19]

[11] Reg. Number: H587

Painter

[43] Published: Feb. 7, 1989

[54] DUAL TOROIDAL ELECTRODES

[75] Inventor: James H. Painter, St. Louis County, Mo.

[73] Assignee: The United States of America as represented by the Secretary of the Air Force, Washington, D.C.

[21] Appl. No.: 111,238

[22] Filed: Oct. 13, 1987

[51] Int. Cl.[4] ..... B23K 9/16

[52] U.S. Cl. ..... 219/75

*Primary Examiner*—Stephen C. Buczinski
*Assistant Examiner*—Linda J. Wallace
*Attorney, Agent, or Firm*—William G. Auton; Donald J. Singer

[57] ABSTRACT

An arc heater having dual toroidal rear electrodes is disclosed. In this configuration, the total arc current can be doubled without increasing the rear electrode erosion that would result with a single rear electrode. Alternatively, the total arc current can remain the same, and be divided over the two rear electrodes, and the rear electrode erosion is significantly reduced. In the first instance the gas enthalpy performance of the heater is significantly enhanced, and in the second instance the heated gas contamination is reduced and the rear electrode life is increased. The basic components of the arc heater are a forward electrode and dual rear electrodes, the forward and dual rear electrodes being separated from each other by cylindircal multi-segment non-axial conducting constrictor modules. Provision is made for gas injection throughout the device. By regulating the air flow distribution and by injecting gas through the rear interelectrode slot the dual anodes of the arc generated are contained to the interface region of the dual rear electrodes.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DUAL TOROIDAL ELECTRODES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to high performance arc heaters, and more specifically to a segmented arc heater which uses dual toroidal electrodes.

Arcs and arc processes have been used since the turn of the century in a myriad of applications ranging from welding to chemical synthesis. With the advent of the missile and space age, a need became apparent for a method of producing reentry conditions in the laboratory in order to investigate the many phenomena that missiles and spacecraft encounter as they travel back to earth. The effort to produce these conditions has led to the development of large arc heaters and plasma jets which can be controlled to give the parameters desired. Small, compact and low power arc jet thrustors have also been developed, as well as small cutting and welding arc torches and high intensity light sources.

High enthalpy ablation tests have achieved air enthalpies of the order of 3000 Btu/lb at 250 atm pressure. The primary limitations to further increases in enthalpy have been arc control, electrode (anode) erosion, and arc radiation loss. The task of reducing electrode erosion in arc heaters is alleviated, to some extent, by the systems disclosed in the following references, the disclosures of which are specifically incorporated herein by reference; U.S. Pat. No. 4,242,532 issued to J. Squibbs; and a technical article by J. E. Harry et al, entitled "Simultaneous Operation of Electric Arcs From The Same Supply," IEEE. Vol. PS-9, No. 4, Dec. 1981.

The Squibbs patent discloses a state-of-the-art electric arc furnace augmented with a method of controlling exhaust gas emissions. While it is an instructive disclosure, it is believed that the electrodes would remain subject to conventional erosion.

The work of J. E. Harry and R. Knight on "Simultaneous Operation of Electric Arcs from the Same Supply" was found to have application to the present concerns. Their results showed that two separate parallel arcs could be maintained from a common power supply by using individual stabilizing resistors for each arc. Three-root discharges (two anodes and one cathode) were produced when separate arcs were coalesced. Their tests showed that series resistors stabilized each arc adjacent to the electrode to which the resistor was connected and one of the separate arc roots to the cathode was extinguished. The arcs involved in their tests were at low power and atmospheric pressure.

In view of the foregoing, it is apparent that there currently remains a need to reduce electrode erosion and increase arc control in arc heaters in high performance applications. The present invention is intended to satisfy that need.

SUMMARY OF THE INVENTION

The present invention includes a high performance arc heater having dual toroidal rear electrodes. In this configuration, the total arc current can be doubled without increasing the rear electrode erosion that would result with a single electrode. Alternatively, the total arc current can remain the same, now divided over the two rear electrodes, and the rear electrode erosion is significantly reduced. In the first instance the gas enthalpy performance of the heater is significantly enhanced and in the second instance the heated gas contamination is reduced and the rear electrode life is increased.

One embodiment of the invention is an arc heater with a forward quarter torus electrode, which serves as the cathode, and dual rear quarter torus anode electrodes. The total arc current is divided evenly between the two rear electrodes by a current distribution circuit with series ballast resistors. The use of the dual rear electrodes reduces rear electrode erosion in the manner described above, while the toroidal shape ehhances cooling of the electrodes.

The arc heater configuration shown in FIG. 1 was selected for the initial dual rear electrode design. It included rear isolation and closure modules, a modified liner and flow guide on the first isolator, a segmented converger, a segmented constrictor, a quarter torus front electrode and a 0.375 in. diameter nozzle throat. The tapered segmented converger was selected to reduce the reverse gas flow and thereby help to center the arc anodes at the inter-electrode gap. The electric arc is generated between the anodes and cathode through a stream of gas, with the arc characterized by a high voltage drop. Provision is made for gas injection throughout the arc heater. By regulating the rear retard air flow rate and by injecting gas through the interelectrode slot, the dual arc anodes generated are confined to the interface region of the dual rear electrodes.

It is a principal object of the present invention to divide a high current, high pressure arc between two separate rear electrodes (anodes) in a controlled repeatable manner.

It is another object of the present invention to provide a design of a high performance arc heater which utilizes dual rear electrodes and thus experiences reduced rear electrode erosion.

It is another object of the present invention to enhance the cooling of the electrodes in arc heaters.

It is another object of the present invention to enhance the arc control in high performance arc heaters.

These together with other objects features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention is a high performance arc heater which, in one configuration, makes use of dual toroidal rear electrodes.

Figure 1:
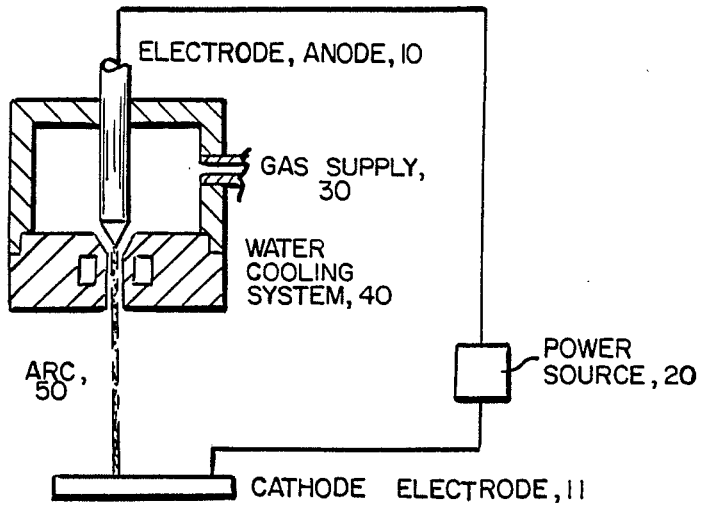
FIG. 1 PRIOR ART
FIG. 1 is an illustration of a prior art electric arc heater.

The reader's attention is now directed towards FIG. 1, which is an illustration of a prior art electric arc device. The system of FIG. 1 is an illustration of the basic elements found in electric arc devices. The electric arc is a luminous discharge of electricity (plasma) between an anode electrode 10 and a cathode electrode 11 through a stream of gas from a supply 30. The result is an electric current in a stream of incandescent gas which is characterized by a large change in space potential. Typical electrodes may be composed of tungsten, copper, or graphite, depending upon the use of the arc. When tungsten is used, a variety of additives such as thoria or zirconia improve the emission of electrons.

The nature of the electric power from the power source 20 and pressure of the gas from the gas supply 30 depends upon the application of the electric arc. In high enthalpy ablation testing the arc current can reach between 500 to 3,000 amps at 30,000 volts to achieve air enthalpies from 30,000 Btu/lb at 1 atm to 3,000 Btu/lb at 250 atm pressure. Problems encountered at high pressure and high power testing include severe electrode erosion, unpredictable arc termination behavior, and inter-segment arc-over. These problems are addressed by the design of the present invention in the manner discussed below.

Figure 2:
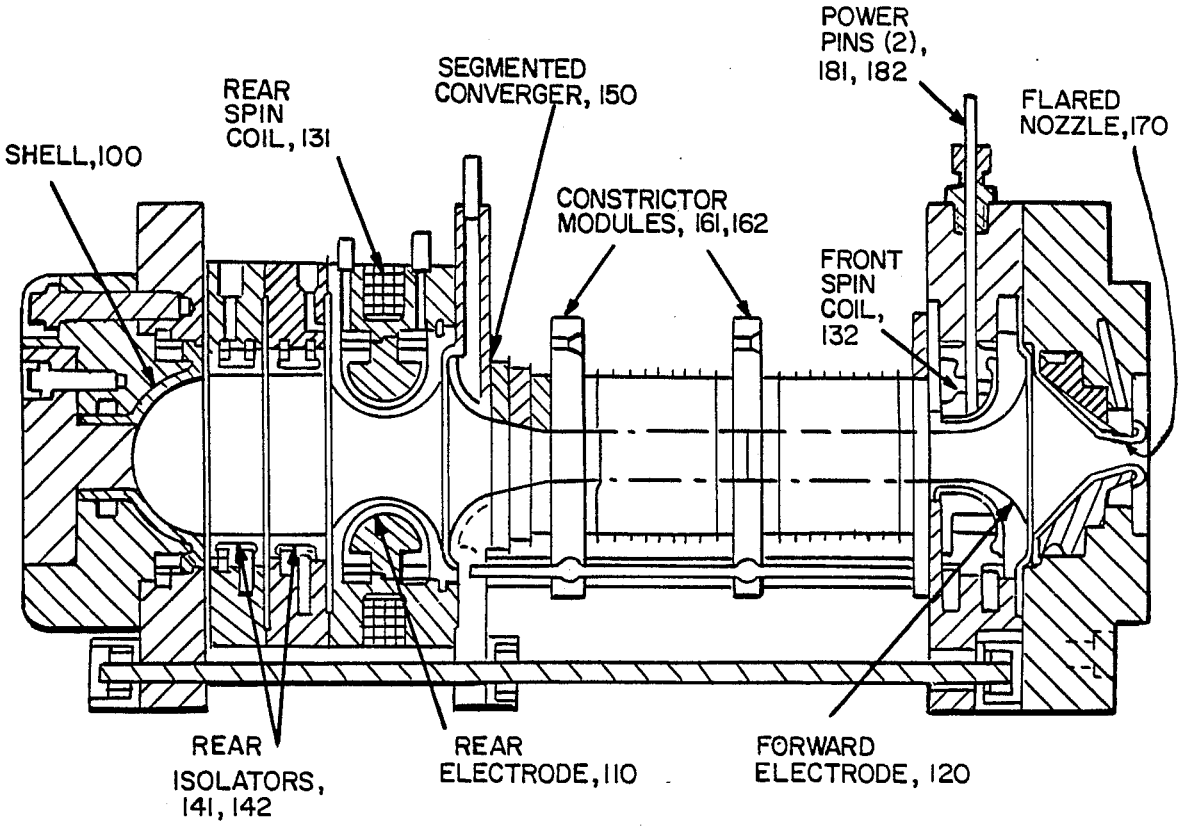
FIG. 2 is an illustration of an electric arc heater with a forward quarter torus electrode and a single rear half torus electrode.

The reader's attention is now directed towards FIG. 2, which is an illustation of a high performance arc heater composed of: a shell housing 100, a single rear electrode 110, a forward electrode 120, spin coils 131,132, isolators 141 and 142, a segemented converger 150, two or more segmented constrictor modules 161 and 162, a flared nozzle 170, and two power pins 181 and 182.

The system of FIG. 2 receives electrical current through the rear spin coil 131 which is electrically connected in series with the positive power supply node and the rear electrode 110. The arc current passes through the anode on the rear electrode surface and then through an electric arc (plasma) stabilized in the segmented converger 150 and constructor modles 161, 162 by the gas stream radial pressure gradients created by the vortex gas injection. The electric arc terminates at the forward electrode cathode 120 where the current is then conducted through the front spin coil 132 and then the power pins 181, 182 to the negative power supply node. The arc heated gas is exhausted through the nozzle 170 where it is utilized. The arc terminations (anode and cathode spots) are rotated on the electrode surfaces by the combined gas dynamic and Lorentz forces created by the gas vortex and the magnetic fields from the spin coils 131, 132.

The system of FIG. 2 is supported by a power supply system which provides an arc and spin coil current between 250–1000 amps. The electric arc is generated between the rear electrode 110 and the forward electrode 120 in the form of a discharge of electricity in the stream of gas. A typical gas used is air and the high voltage drop between the electrodes is characterized by the gas flow rate, arc pressure and arc current.

The primary gas is input through two vortex gas injector stations 190 and 191 which are physically connected with an external supply of gas (as shown in FIG. 1). The gas passes from the rear toroidal electrode 110 through the constrictor modules 161 and 162 in a stream past the forward electrode 120, and through the flared nozzle 170. Both constrictor modules 161 and 162 and the flared nozzle 170 have a central aperture through which the stream of gas passes. In each case the central aperture has a diameter which is selected to constrict the arc in the stream of gas and to optimize the energy exchange between the arc column and the gas stream.

The design of the system of FIG. 2 has a number of advantages over the prior art system of FIG. 1. First, the forward and rear electrodes 110 and 120 are both toroidal and have the form of a donut-shaped annular ring. The torus shape of the electrodes enhances their cooling.

The rear isolators 141 and 142 are used to electrically isolate the rear electrode 110 from the shell 100 of the arc heater. The two cathode power pins 181 and 182 connect the arc heater to a power suppply like that of FIG. 1. The forward electrode 120 is also insulated by electrical insulation to control the cathode location.

The front and rear spin coils 132 and 131 each receive electric current so that they produce a magnetic field to magnetically rotate and stabilize the electric arc termination. The arc/coil current ranges between 250 and 1000 amps. The rear spin coil 131 is an internally-cooled coated-tubing coil which provides an acceptable magnetic field strength with only a few turns (6–12 turns). The front spin coil 132 is an internal coil of flat metal which shapes a magnetic field for maximum interaction angles of the arc column and the forward electrode.

Like the system of FIG. 1, the air heater of FIG. 2 receives this stream of gas from an external gas supply. The gas flow system of FIG. 2 has typically provided air flow rates of about 0.25 to 1.00 lb/s at arc pressures of 25 to 100 atmospheres. The stream of gas primarily enters the electrical arc heater downstream of the rear electrode 110, and flows through the two constrictor modules 161 and 162 and out through the flared nozzle 170.

While the system of FIG. 2 is an advance over the prior art system of FIG. 1, the rear electrode is still subject to erosion in high enthalpy testing. A solution to the electrode erosion problem is provided by the system of FIG. 3, as discussed below.

Figure 3:
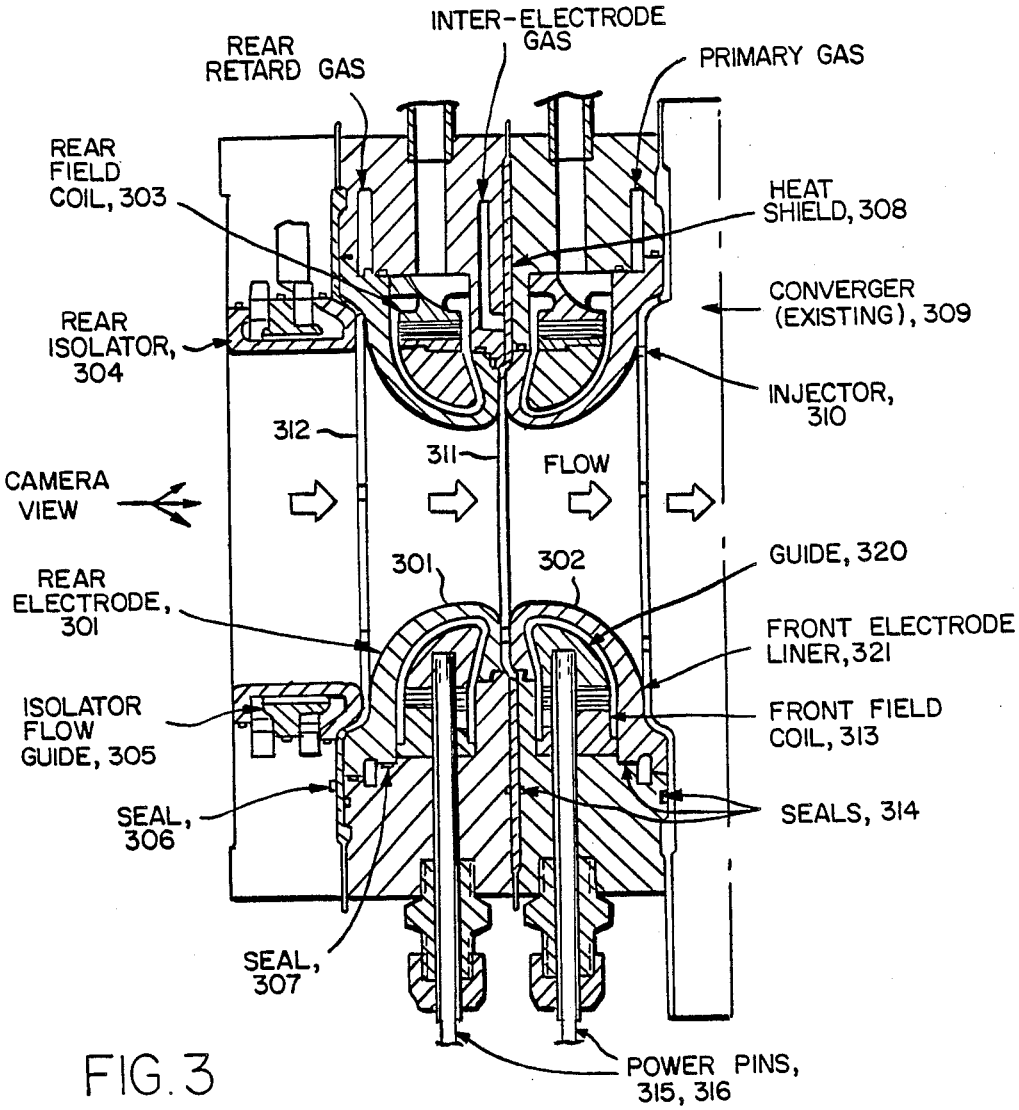
FIG. 3 is a sectional view of one embodiment of the present invention which is used to replace the single rear electode of FIG. 2.

FIG. 3 is a detailed sectional view of the dual rear electrode design of the present invention. The system of FIG. 3 is used to replace the single rear electrode 110 of the system of FIG. 2 with two rear electrodes 301 and 302 which are both anodes, while the forward electrode 120, as depicted in FIG. 2, remains the cathode.

The dual rear electrode assembly of FIG. 3 contains two quarter torus electrodes 301 and 302, which are electrically isolated from each other with provision for gas injection at both ends and in the middle. This design has several features proven successful in single electrode operation and allows excellent viewing of the arc attachment region for high frame rate motion pictures. The narrow gap between electrodes allows "splitting" the arc to share the arc current in a high pressure region where the voltage gradients are quite high. The curvature of the electrodes in the narrow gap area enhance the maximum allowable heat flux by accelerating cold internal coolant to the wall thereby displacing the vapor cells which collapsed in the main stream.

The ultimate objective of the dual rear electrode design is to divide a high current, high pressure arc between two separate anodes in a controlled repeatable manner. The anodes are at the rear of the arc heater in the relatively cold gas region. In this configuration, the total arc current can be doubled without increasing the electrode erosion that would result with a single electrode. Alternatively, the total arc current can remain the same, now divided over the two electrodes, and the electrode erosion is significantly reduced. In the first instance the gas enthalpy performance of the heater is significantly enhanced and in the second instance the heated gas contamination is reduced and the electrode life is increased.

As mentioned above, provision is made for gas injection at both ends and in the middle of the device. By increasing the rear retard air flow rate, 312, and by injecting gas through the interelectrode slot, 311, the arc generated is initiated in the interface region of the dual rear electrodes, and progresses to the forward electrode 120 of the system of FIG. 2.

Each of the dual rear electrodes receive current from the same supply. Greater detail of such power supply systems and associated circuits which split the current is found in the technical article by J. E. Harry et al, entitled "Simultaneous Operation of Electric Arcs From The Same Supply", IEEE. Vol. PS-9, No. 4, Dec. 1981. This article shows that two parallel arcs can be maintained from a common power supply by using individual stabilizing resistors for each arc. Three-root discharges (two anodes and one cathode) were produced.

Figure 4:
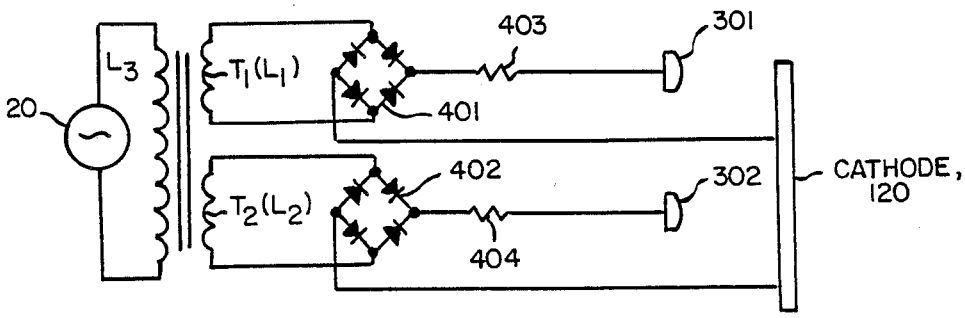
FIG. 4 is an electrical schematic of a power supply circuit which supplies power to the system of FIG. 3.

FIG. 4 is an electrical schematic of a power supply circuit capable of supplying the dual rear electrode system of FIG. 3, when implemented in the electric arc heater of FIG. 2. The power supply circuit of FIG. 4 is a modified version of a circuit disclosed in the above-cited article by Harry et al. The circuit divides the current from a power source 20 for use by the two anodes 301 and 302 of FIG. 3 with the single cathode 120 of FIG. 2 using; a transformer $T_1$, a diode quad 401, and two ballast resistors 403 and 404.

The transformer $T_1$ is actually composed of an inductor $L_1$ which is inductance coupled with a second inductor $L_2$. This inductor $L_2$ is in a parallel circuit with the electrical power supply 20. The transformer is connected in parallel with a diode quad 401. The diode quad has a positive node connected to two ballast resistors, and a negative node connected with the cathode 120.

Each ballast resistor is used in series with one of the rear electrodes and is constructed with 60 water-cooled stainless steel tubes. Each tube is 10 feet long with 0.25 in. diameter and a 0.020 in thick wall. The coolant flow rate is 2 gpm per tube for a total of 120 gpm. The maximum power dissipation capability is 2.5 M.W. Each tube has an individual resistance of 0.232 ohms.

The ballast resistance is 3.4 ohms. for the single rear electrode of FIG. 2. The ballast resistance in series with each electrode for the dual rear electrode system of FIG. 3 is varied from 3.4 to 6.7 ohms. The resistor is always in the high voltage leg of the power circuit. Measurement of the differential voltage at the dual electrodes gives a direct readout of the differential arc current. The ballast resistor acts as a primary controller of the current flow to each electrode.

Returning to the system of FIG. 3, note that each of the two rear electrodes 301 and 302 are each electrically connected with their own separate magnetic field coil 303 and 313. Each arc/coil current ranges between 400–800 amps. Each magnetic field coil is an internal Bitters coil with 6–12 turns which produces a magnetic field with a strength of between 0.02T and 0.04T.

The rear isolator 304 in FIG. 3 electrically inolates the dual rear electrodes 301 and 302 in the same manner as the rear isolator 142 of FIG. 2.

FIG. 3 has vortex gas injector stations 310, 311 and 312 for the provision for gas injection at both ends and in the middle of the device. By increasing the rear retard air flow rate and by injecting gas through the interelectrode slot the arc generated is initiated in the interface region of the dual rear electrodes. Suitable candidates for the gas include air, nitrogen, or argon. The vortex gas injector stations 310–312 are a set of flow guides which receive the gas from a supply as depicted in FIG. 1. One vortex gas injector station 312 is to the rear of both of the dual rear electrodes 301 and 302; one injector station 311 is between the dual electrodes 301 and 302; and one injector station 310 is forward of the dual electordes to provide the stream of gas as described above.

Figure 5:
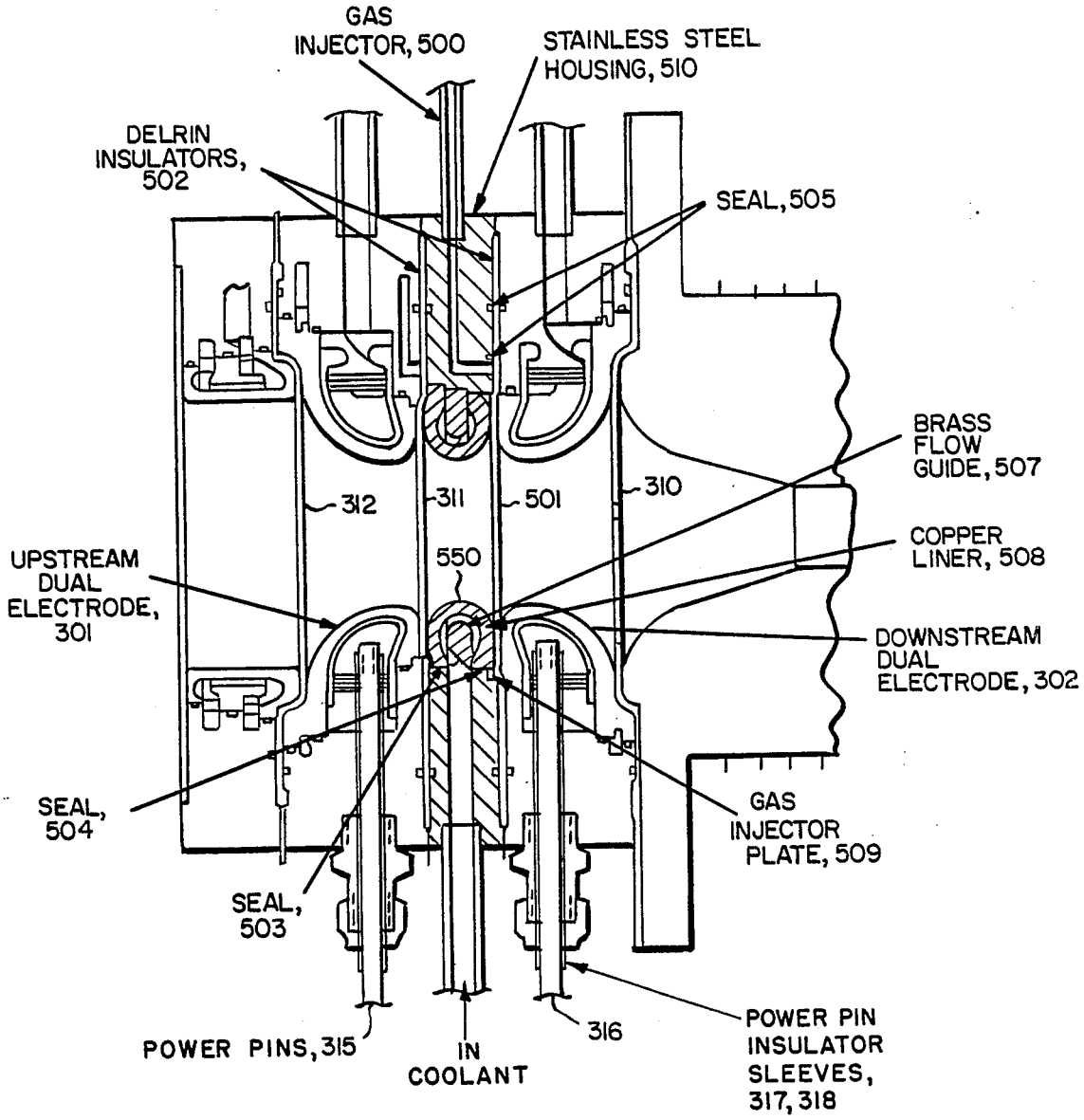
FIG. 5 is a sectional view of another embodiment of the present invention.

FIG. 5 is a detailed sectional view of another embodiment of the dual rear electrode design of the present invention. Like the system of FIG. 3, the system of FIG. 5 is intended for use as a replacement for the single rear electrode in the arc heater of FIG. 2. The system of FIG. 5 differs from the system of FIG. 3 in that it includes an inter-electrode component (or a dummy electrode) 550 between the dual rear electrodes 301 and 302.

Operation of the system of FIG. 3 indicated that, in the use of dual rear electrodes, inter-electrode gas injection is critical. Accordingly, the system of FIG. 3 has three vortex gas injector stations 310, 311 and 312 for injection of gas at both ends, and in between the dual rear electrodes. The inter-electrode component is a dummy electode which is placed between the two functioning rear electrodes and increases the space therebetween. With the increase in electrode separation, the system of FIG. 5 is provided with four vortex gas injector stations 310–312 and 501. This is necessary when using the inter-electrode component 550 to prevent inter-electrode arcing, or double short arcs between the dummy electrode 550 and the active dual rear electrodes 301 and 302.

The system of FIG. 5 is operated in a similar manner that of FIG. 3. As with the system of FIG. 3, both the active dual rear electrodes 301 and 302 are anodes which are supplied with electrical power through their respective power pins 315 and 316. These power pins are, in turn, electrically connected to a power supply circut similar to that depicted in FIG. 4.

In the operation of the system of FIG. 5, nitrogen can be injected between the inter-electrode component 550 and the dual rear electrodes 301 and 302. The use of nitrogen gas ($N_2$) serves to increase the ionization potential and thus the inter-component resistance to arcing.

The inter-electrode component 550 in FIG. 5 is composed of: a toroidal copper liner 508, a brass coolant flow guide 507, and a stainless steel housing 510. Additionally a set of Delrin insulators 502 and mykroy heat insulators 506 serve to insulate the dummy electrode electrically from the active dual rear electrodes 301 and 302.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An electrical arc heater assembly for use with a supply of electrical power and a supply of pressured gas, said electrical arc heater assemply comprising:

a means for injecting a stream of gas into said heater assembly, said injecting means being connected to said supply of pressured gas and receiving pressured gas thereby;

a forward toroidal electrode mounted in said heater assembly and serving as a cathode;

first and second rear toroidal electrodes which are mounted in said heater assembly and respectively serving as a first and second anode to generate an electrical arc through said stream of gas to said cathode when said first and second anode and said cathode receive electrical power; and a means for conducting said electrical power from said supply of electrical power to said forward toroidal electrode and said first and second rear toroidal electrodes.

2. An electrical arc heater as defined in claim 1, wherein said injecting means comprises:

first, second and third vortex gas injector stations which are each connected with said supply of pressured gas and which are housed in said heater assembly in proximity with said first and second rear toroidal electrodes and initiate said stream of gas in said heater assembly, said first vortex gas injector station being located upstream from said first rear toroidal electrode and having a set of apertures for tangential injection of gas;

said second vortex gas injector station being located between said first and second rear toroidal electrodes and having a second set of apertures which tangentially injects some of said gas therebetween; and said third gas injector station being located downstream of said second rear toroidal electrode and having a third set of apertures to release some of said gas downstream from said first and second dual toridal electrodes.

3. An electric arc heater, as defined in claim 2 including an inter-electrode component which is fixed in said heater assembly between said first and second rear toroidal electrodes and increasing space therebetween, said inter-electrode component comprising:

a steel body which is fixed in said heater assembly housing between said first and second rear toroidal electrodes, said steel body having a central aperature connected with said supply of pressured gas; and thermoplastic insulators and Mykroy heat shields to electrically insulate said inter-electrode component from the said first and second rear toroidal electrodes;

a half-torous liner which is attached to said steel body and which projects between said first and second rear toridal electrodes.

4. An electric arc heater, as defined in claim 3, wherein said injection means includes:

a fourth vortex gas injector station which is fixed between said inter-electrode component and said first rear toroidal electrode while said second vortex gas injector station is fixed between said inter-electrode component and said second rear toridal electrode, said fourth vortex gas injector station receiving additional pressured gas from said central aperture of the steel housing of said inter-electrode component, said fourth vortex gas injector station thereby increasing said stream of gas to help prevent undesired arcing between said inter-electrode component and said first and second rear toridal electrodes;

a constrictor module which is fixed in said heater assembly and has a central aperture and which conducts said stream of gas from said first and second rear toridal electrode, said central aperture having a diameter which is selected to optimize the energy exchange from the electric arc to the gas stream; and a nozzle which is fixed in said heater assembly downstream from said forward toridal electrode to conduct said stream of gas past said forward toridal electrode and outside the heater assembly for utilization.

5. An electrical arc heater, as defined in claim 4, wherein said conducting means comprises:

a first inductor which is electrically connected in a parallel circuit with said supply of electrical power;

a second inductor which is electromagnetically connected with said first inductor to receive thereby said electrical power;

first diode quad which is connected in parallel with said second inductor and having a positive node and a negative node;

a forward toroidal electrode connecting said negative node of said first diode quad with said cathode;

a first and second rear toriodal electrode each respectively connecting said positive node of said first diode quad with said anodes; and first and second ballast resistors each respectively connecting said positive node of said diode quad to said first and second rear toridal electrodes so that they perform as anodes in said electric arc heater.

6. An electric arc heater, as defined in claim 5, including:

a first and second rear magnetic spin coil which are fixed in said heater assembly in proximity with said first and second rear toridal electrodes, and which are each electrically connected to said conducting means to generate a magnetic field for rotating said electric arc anodes; and a front magnetic spin coil which is fixed in said heater assembly in proximity with said forward toridal electrode, and which is electrically connected with said conducting means to help generate said magnetic field for rotating said electric arc cathode.

* * * * *